(12) United States Patent  
Dumas

(10) Patent No.: US 9,382,924 B2  
(45) Date of Patent: Jul. 5, 2016

(54) TRANSMISSION SHIFTING ASSEMBLY AND METHOD

(75) Inventor: Andrew D. Dumas, Jericho, VT (US)

(73) Assignee: Sonnax Industries, Inc., Bellows Falls, VT (US)

( * ) Notice: Subject to any disclaimer, the term of this patent is extended or adjusted under 35 U.S.C. 154(b) by 845 days.

(21) Appl. No.: 13/326,772

(22) Filed: Dec. 15, 2011

(65) Prior Publication Data

US 2013/0152778 A1 Jun. 20, 2013

(51) Int. Cl.
*F15B 11/036* (2006.01)
*F16H 61/30* (2006.01)
*F16H 63/30* (2006.01)
*F16D 49/12* (2006.01)

(52) U.S. Cl.
CPC .............. *F15B 11/036* (2013.01); *F16H 61/30* (2013.01); *F16H 63/3003* (2013.01); *F16D 49/12* (2013.01); *F16H 2063/3006* (2013.01)

(58) Field of Classification Search
CPC ............ F16D 2121/04; F16D 2125/06; F16D 2125/10; F16D 49/12; F16D 49/08; F15B 11/0365; F15B 2211/7055; F15B 2211/7056; F15B 2211/7716; F16H 63/3003
USPC ............................................. 92/62, 110, 152
See application file for complete search history.

(56) References Cited

U.S. PATENT DOCUMENTS

| | | | |
|---|---|---|---|
| 2,757,552 A * | 8/1956 | English | F16H 47/08 475/119 |
| 2,831,365 A * | 4/1958 | Herndon | 477/142 |
| 2,901,888 A * | 9/1959 | Swift | 91/526 |
| 3,353,637 A * | 11/1967 | Chana | 188/347 |
| 4,601,233 A * | 7/1986 | Sugano | 92/52 |
| 5,588,928 A * | 12/1996 | Koivunen | 475/126 |
| 5,944,627 A | 8/1999 | Darling-Owen et al. | |
| 7,066,305 B2 * | 6/2006 | Grzesiak et al. | 188/77 W |

FOREIGN PATENT DOCUMENTS

JP 59009342 A * 1/1984

OTHER PUBLICATIONS

JPS599342A translation to English. 1984.*
"How the Powerglide Works," by Carl H. Munroe. Powerglide Transmission Handbook, pp. 20-25, 2001.

* cited by examiner

*Primary Examiner* — Nathaniel Wiehe
*Assistant Examiner* — Michael Quandt
(74) *Attorney, Agent, or Firm* — Downs Rachlin Martin PLLC

(57) ABSTRACT

An transmission servo assembly having a dual piston assembly for use in an automobile to transmission is described. The dual piston assembly includes a primary and a secondary piston that, when included within an assembly housing, provide surfaces that may be acted upon by a pressurized fluid so as to drive a servo pin into and away from a band within the transmission. The dual piston assembly allows for the application of a high apply force to servo pin while reducing the pressure of both an apply fluid and a release fluid, and therefore the amount of power used by a fluid pump external to the transmission servo assembly. The transmission servo assembly also substantially eliminates band drag by balancing the pressure applied to surfaces of dual piston system and by providing a biasing member designed and configured to provide suitable initial and ending forces to dual piston system.

10 Claims, 3 Drawing Sheets

TRANSMISSION SHIFTING ASSEMBLY AND METHOD

FIELD OF THE INVENTION

The present invention generally relates to the field of automobile transmissions. In particular, the present invention is directed to a transmission shifting assembly and method.

BACKGROUND

An automotive transmission alters the power generated by a vehicle's engine and transmits the resultant power to a drive shaft, which turns the vehicle's wheels. Transitioning between one or more gears within some transmissions is made possible by the use of a transmission servo assembly. Generally, the transmission servo assembly applies a servo pin to a braking mechanism, which locks a portion of the gear train, thereby assisting a gear change. For example, in FIG. 1 there is shown a prior art transmission 10 including a servo assembly 20 and a band 12 that is applied by the servo assembly to shift the vehicle between low and high gears. Band 12 wraps about a reverse input drum 14 (only partially shown), which has one end anchored to a case 16 of transmission 10 by a band anchor pin 18. Input drum 14 is coupled to a reaction sun shell which is splined to a reaction sun gear (not shown). When band 12 is applied by the servo assembly 20 (moving the pin portion of the servo assembly out of the page as seen in FIG. 1), input drum 14, the reaction sun shell, and the reaction sun gear are all held stationary, thus facilitating the engagement of one of the gears.

To improve the transition between gears, automotive enthusiasts may seek to increase the fluid pressure within such a servo assembly. For example, for high performance transmissions, fluid pressures of 300 psi or more are typical operating pressures. Increasing the fluid pressure, however, requires that additional energy to drive the fluid pump to obtain the desired fluid pressure—energy that would otherwise be used to propel the car forward. In some automotive servo assemblies operating under high pressures, the configuration of the assembly does not provide for effective or complete removal of the apply pressure from the piston, and consequentially the servo pin. This incomplete retraction of the servo pin is further exacerbated by the increased operating fluid pressure, which further unbalances the pressure differences within the servo assembly, thereby increasing the risk of band drag, e.g., band 12 does not fully release from input drum 14, considerably. Band drag leads to band failure and thus an inability to shift gears.

SUMMARY OF THE DISCLOSURE

In a first exemplary aspect, a transmission servo assembly is described having an assembly housing including an aperture, the transmission servo assembly including: a servo pin having an exterior surface coaxial with a longitudinal axis; a primary piston coaxial with the servo pin and having an interior surface that slidingly engages the exterior surface of the servo pin; and a secondary piston coaxial with the primary piston and the servo pin, wherein the secondary piston has an interior surface that slidingly engages the exterior surface of the servo pin, and wherein the primary piston and the secondary piston coact to move the servo pin relative to the aperture.

In another exemplary aspect, a transmission servo assembly is described that includes an assembly housing having an interior surface and an aperture; a servo pin having an exterior surface and a shoulder, the servo pin being designed and configured to move translationally with respect to the assembly housing and within the aperture; a primary piston sealingly engaged within the assembly housing and slidingly coupled to the outer surface; a secondary piston sealingly engaged within the assembly housing and slidingly coupled to the outer surface and having an first end conformally confronting a portion of the first piston and a second end conformally confronting the shoulder.

In yet another exemplary aspect, a transmission servo assembly is described that includes an assembly housing having an interior surface and an aperture; a cover sealingly coupled to the assembly housing; a servo pin having an outer surface and a shoulder, the servo pin being designed and configured to move translationally with respect to the assembly housing and within the aperture; and a dual piston assembly disposed within the assembly housing and configured to apply a force the shoulder; wherein when the servo pin is in an unapplied position, the servo pin and a portion of the dual piston rests proximate the cover.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 2:
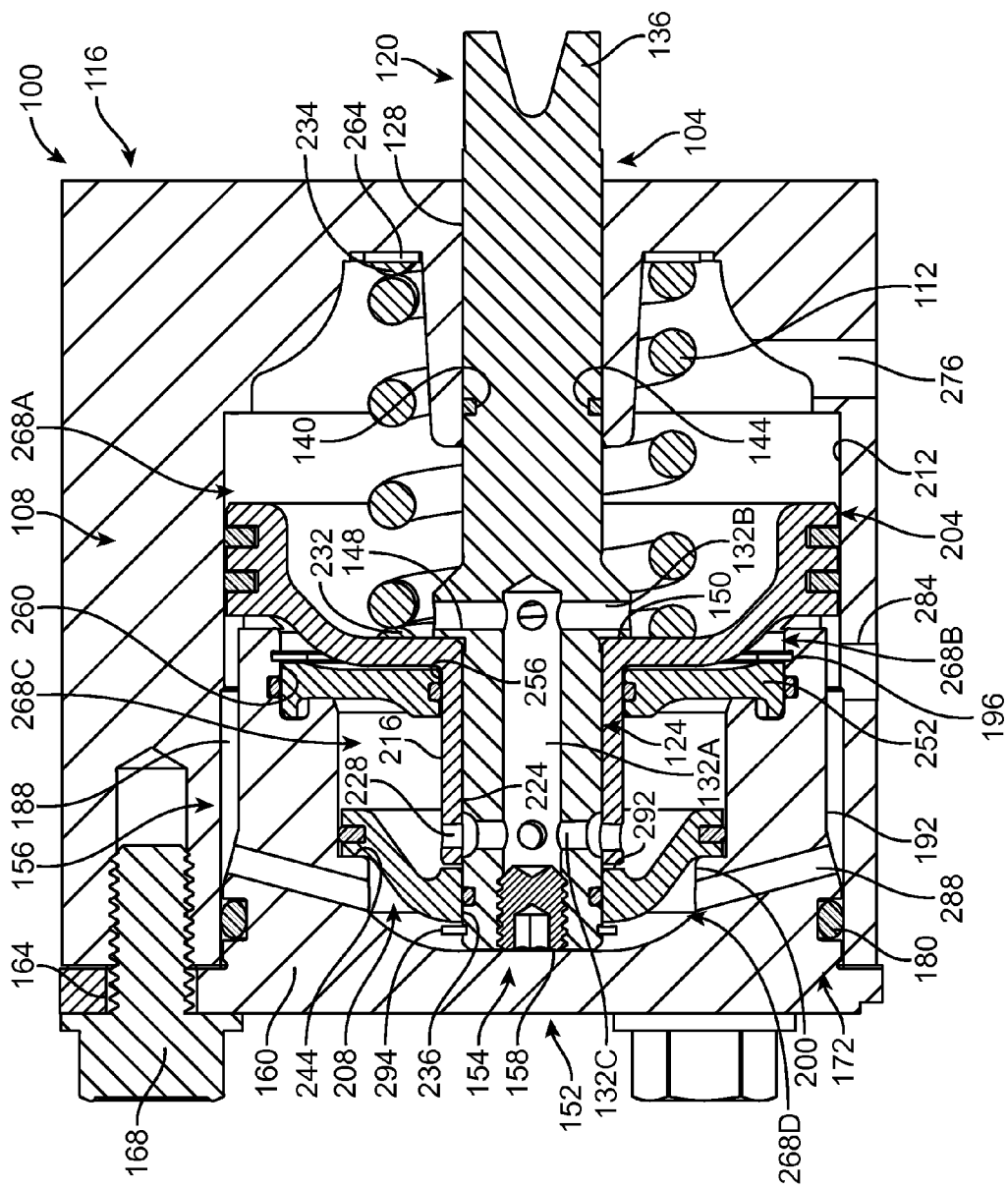
FIG. 2 is a schematic of a transmission servo assembly according to an embodiment of the present invention.

FIG. 2 shows an exemplary transmission servo assembly 100 according to an embodiment of the invention in an unapplied position. At a high level, transmission servo assembly 100 moves a servo pin 104 between the applied position (not shown) and the unapplied position shown in FIG. 2 with the assistance of pressurized fluid that acts upon a dual piston system 108. In an exemplary embodiment transmission servo assembly 100 is designed and configured for use in a transmission from the group of Powerglide, GM4L60E, GM200-4r, Chrysler 48RE, Ford C4, and Ford C6. In exemplary embodiments, the pin may be configured to cooperate with a band as described above or other braking element. Through the use of dual piston system 108, transmission servo assembly 100 can provide a high apply force to servo pin 104 while reducing the pressure of both the apply fluid and the release fluid, and therefore the amount of power used by a fluid pump external to the transmission servo assembly. Transmission servo assembly 100 also substantially eliminates band drag by balancing the pressure applied to surfaces of dual piston system 108 and by providing a biasing member 112 designed and configured to provide suitable initial and ending forces to dual piston system 108 so as to rapidly unapply servo pin 104.

Figure 3:
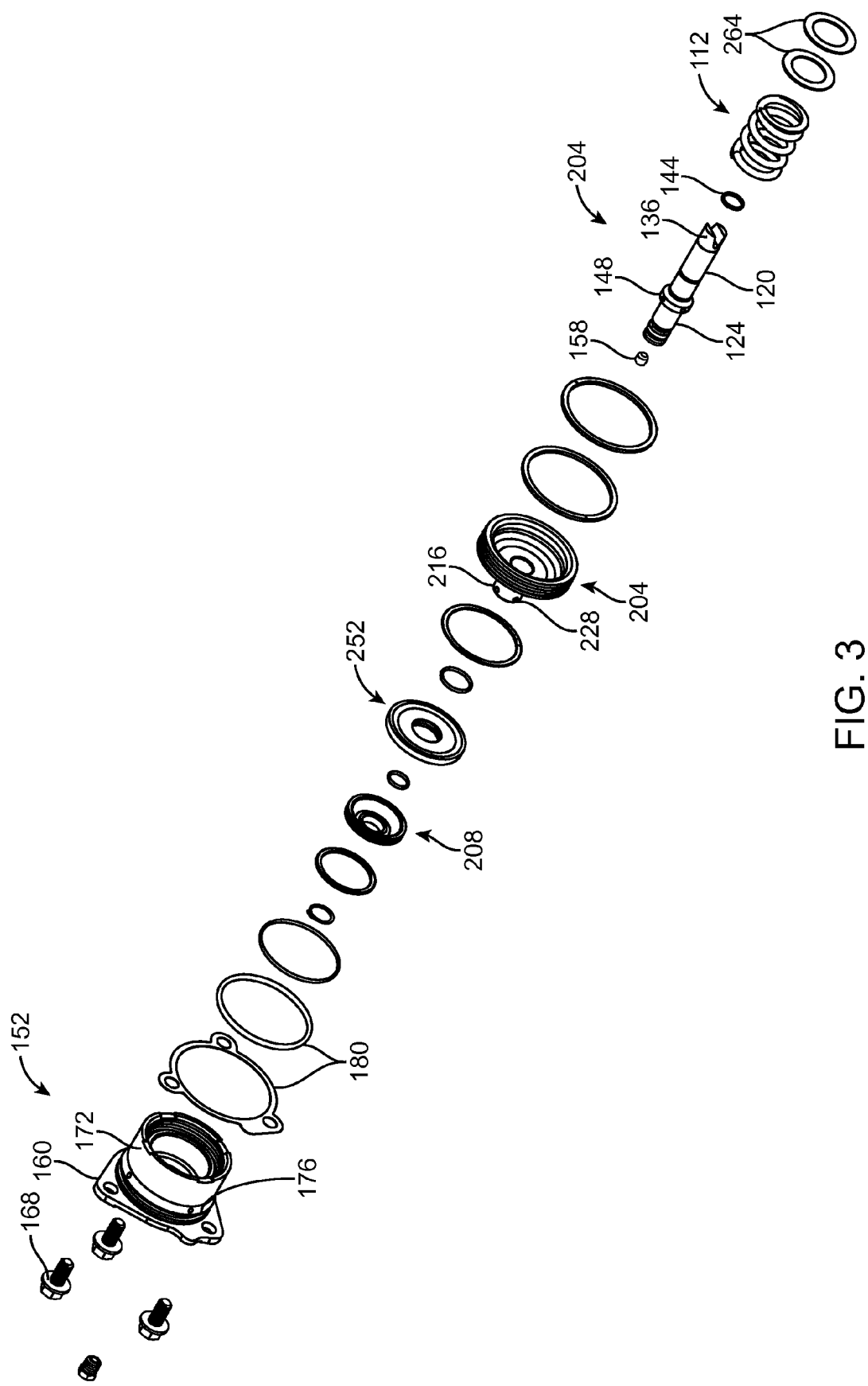
FIG. 3 is an exploded perspective view of a transmission servo assembly according to an embodiment of the present invention.

With reference to FIGS. 2 and 3, transmission servo assembly 100 includes a servo pin 104 that moves translationally with respect to an assembly housing 116. As shown, servo pin 104 is generally cylindrical and includes a first portion 120 that resides partially within assembly housing 116 and a second portion 124 that resides entirely within the assembly housing. First portion 120 extends through an aperture 128 in assembly housing 116 so as to engage a braking element (not shown) residing external to the assembly housing. As will be discussed in more detail below, second portion 124 includes a plurality of fluid tunnels 132A-C that aid in the distribution of release fluid throughout transmission servo assembly 100.

Figure 1:
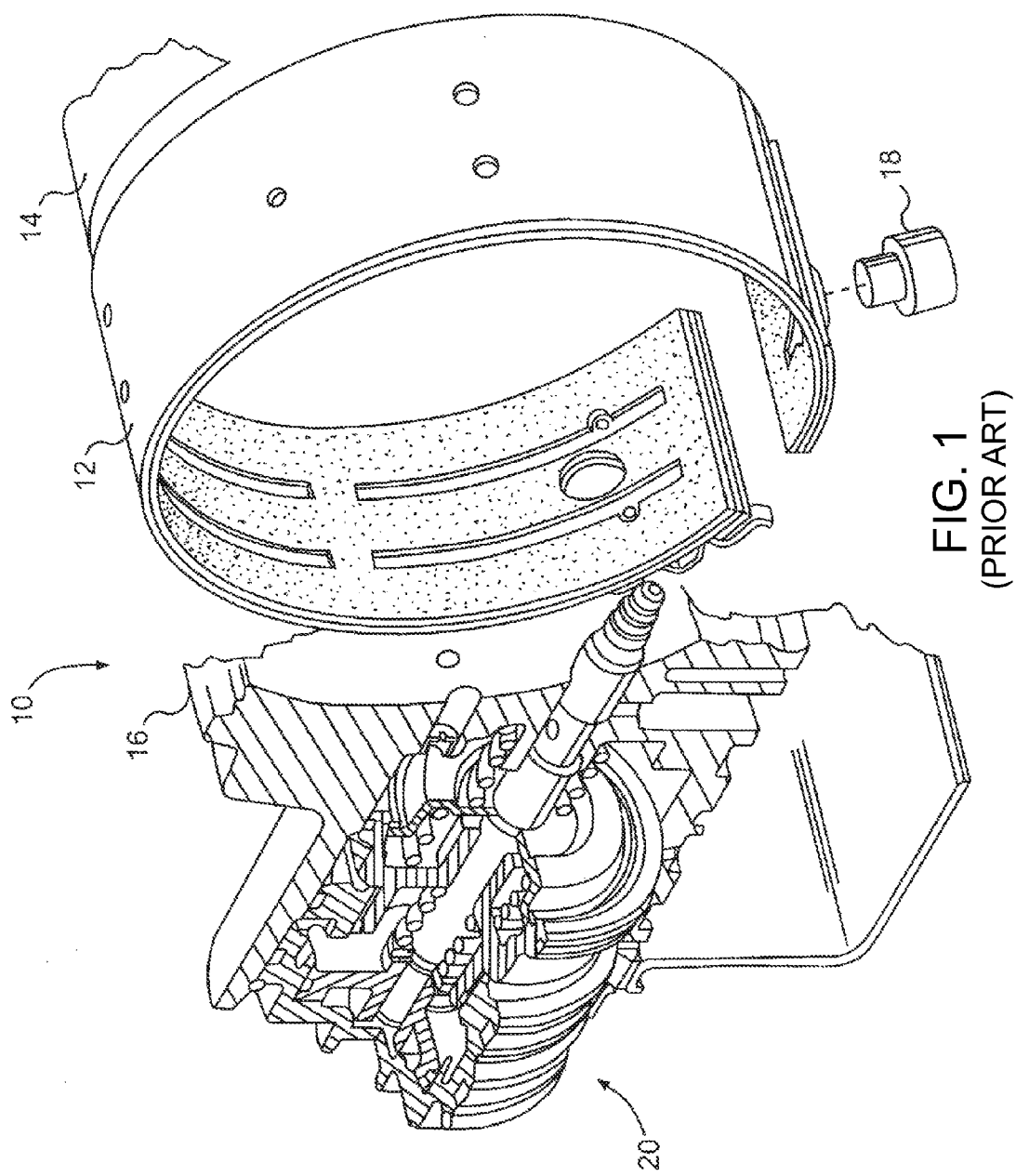
FIG. 1 is a perspective cut-away view of a portion of a prior art transmission.

First portion 120 includes an apply tip 136 at its distal end for engaging the braking element, such as band 12 (FIG. 1). First portion 120 can also include one or more annular depressions 140 for supporting a sealing member 144, thereby providing a fluid seal between the servo pin 104 and assembly housing 116. Servo pin 104 also includes a shoulder 148 interposed between second portion 124 and first portion 120. Shoulder 148 provides a ledge 150 that can be acted upon by a portion of dual piston assembly 108 (described more fully below).

Adjacent end 154 of second portion 124 is a cover 152 that mates with assembly housing 116 to form a sealed fluid chamber 156. Cover 152 includes a body 160 with a plurality of apertures 164 that accept a corresponding number of bolts 168, which mount the cover to assembly housing 116. Extending from body 160 is an annular projection 172 including sealing flang 176, which is configured and dimensioned to enter into and sealingly engage with assembly housing 116 on its inner circumference via a sealing member 180. Annular projection 172 is also sized and configured to leave an apply fluid gap 188 between an outer surface 192 of the second cover portion and the assembly housing. In the embodiment shown in FIG. 2, annular projection 172 also includes part of an apply pathway—(discussed more fully below) that extends from outer surface 192 to an inner surface 200 of the second cover portion.

As mentioned above, servo pin 104 also includes a plurality of release fluid tunnels 132 that fluidly couple chambers 268 (described in detail below) within transmission servo assembly 100. A first fluid tunnel 132A extends from end 154 of second portion 124 along the longitudinal axis of servo pin 104 to about shoulder 148. Typically, although not necessarily, first fluid tunnel 132A is created by removing material from servo pin 104, which may require the use of, for example, a set screw 158 or other similar structure, to seal the end of the first fluid tunnel proximate end 154. Other designs and configurations of servo pin 104 may not require set screw 158, for example, if the servo pin is designed and configured such that the servo pin is of two part construction (not shown) that provides a first part with a portion of first fluid tunnel and a second part with another portion of first fluid tunnel. In this example, when the two parts are joined the completed first fluid tunnel would reside inside the servo pin without creating an aperture at end 154.

A second fluid tunnel 132B provides a pathway to first fluid tunnel 132A for release fluid entering assembly housing 116. In an exemplary embodiment, two second fluid tunnels 132B are provided in shoulder 148, each having longitudinal axes that are generally perpendicular to each other and that are generally perpendicular to the longitudinal axis of servo pin 104. In alternative embodiments, more or fewer second fluid tunnels 132B may be included with servo pin 104.

A third fluid tunnel 132C provides an pathway for release fluid to enter and exit first fluid tunnel 132A proximate end 154. In an exemplary embodiment, two third fluid tunnels 132C are provided proximate end 154, with each of the third fluid tunnels having longitudinal axis that are generally perpendicular to the longitudinal axis of servo pin and to each other. In alternative embodiments, more or fewer third fluid tunnels 132C may be included with servo pin 104.

Dual piston assembly 108 resides within sealed fluid chamber 156 and includes a primary piston 204 and a secondary piston 208. Primary piston 204, as shown in FIG. 3, is a generally annular component sized and configured, as shown in FIG. 2, to mate with an internal surface 212 of assembly housing 116. Primary piston 204 includes a tubular region 216 that has an internal surface 224 that is sized and configured to accept servo pin 104. Tubular region 216 is coaxial with the longitudinal axis of servo pin 104 and interior surface 224 slidingly engages servo pin 104 along the longitudinal axis of second portion 124. In an exemplary embodiment, tubular region 216 also includes at least one aperture 228 that coincides with fluid tunnel 132A.

Secondary piston 208, as shown in FIG. 3, is a generally annular component sized and configured, and as shown in FIG. 2, to reside within cover 152. Secondary piston 208 includes an internal surface 236 sized and configured to slidingly engage servo pin 104. As shown in FIG. 2, an outer portion 244 of secondary piston 208 may, when servo pin 104 is in the unapplied position, rest against a portion of the interior of cover 152.

Positioned around tubular region 216 of primary pistion 204, between the larger diameter region of the primary piston and secondary piston 208, is a separator 252. Separator 252 is generally annular having an inner edge 256 and an outer edge 260. Inner edge 256 is sized to slidingly engage tubular region 216, whereas outer edge 260 sealingly engages cover 152. Positioned between primary piston 204 and separator 252 is a rotor clip 196.

As noted above, transmission servo assembly also includes a biasing member 112. Biasing member 112 has a first end 232 in contact with primary piston 208 and a second end 234 in contact with assembly housing 116. In an exemplary embodiment, the initial and ending force associated with biasing member 112 can be adjusted via the use of one or more annular shims 264 that may be placed interpose the biasing member and assembly housing 116.

Primary piston 204 and secondary piston 208, when considered with other components of transmission servo assembly 100 define a plurality of fluid chambers 268. In an embodiment, primary piston 204, in conjunction with assembly housing 116 and servo pin 104, define a first fluid chamber 268A that accepts release fluid via a release aperture 276 in assembly housing 116. On the opposite side of primary piston 204 from first chamber 268A, the primary piston, assembly housing 116, servo pin 104 and separator 252 form the boundaries of second chamber 268B, which is fluidly connected to an external pump (not shown) that delivers pressurized apply fluid. On the opposite side of separator 252 from second chamber 268B, the separator, tubular region 216, secondary piston 208, and cover 152 define the boundaries of third chamber 268C that receives release fluid, which, in an embodiment, enters and exits through aperture 228. On the opposite side of secondary piston 208 from third chamber 268C, the secondary piston, servo pin 104, and cover 152, define the boundaries of fourth chamber 268D, which receives apply fluid via fluid gap 188.

Fluid chambers 268A-D receive pressurized fluid, either apply fluid or release fluid as outlined above, via fluid pathways within transmission servo assembly 100. In an exemplary embodiment, a release pathway begins, i.e., release fluid enters upon pressurization (and exits when depressurization occurs), through release port 276 where it enters fluid chamber 268A. Some of the release fluid within fluid chamber 268A enters a second fluid tunnel 132B, then travels through first fluid tunnel 132A, and exits third fluid tunnel 132C to reach the end of the release pathway at fluid chamber 268C.

The apply pathway includes an apply fluid port 284 located in a sidewall of assembly housing 116. Apply fluid travels through apply fluid port 284 and into fluid gap 188. Apply fluid can then flow directly to fluid chamber 268B or can flow through port 288 located in cover 152 so as to reach fluid chamber 268D.

In use, apply fluid enters from a pump (not shown) through apply fluid port 284 to chambers 268B and 268D. The fluid exerts a force on primary piston 204 and secondary piston 208 that is sufficient to overcome the biasing force from biasing member 112 and move the two pistons, in tandem, toward assembly housing 116. The force on secondary piston 208 is transmitted to primary piston 204 at point 292, where the secondary piston and primary piston meet. The resulting force on secondary piston 208 and primary piston 204 is then transmitted to servo pin 104 at ledge 150, thereby driving apply tip 136 into an external braking element (not shown). Rotor clip 196 substantially prevents axial movement of sepais 1982 lbf. The greater applied force realized by dual piston assembly 108 is because of the increased apply surface area provided by the combination of primary piston 204 and secondary piston 204. The increased apply force allows for a more resistive biasing member, such as biasing member 112, to be used by transmission servo assembly 100 than the one used by prior art transmission servo assembly 20. As shown in Table 1, the biasing member of prior art transmission servo assembly and transmission servo assembly 100 provides a force of 111 lbf and 160 lbf, respectively, when the servo pin is in the fully applied position. As is evident, despite the greater fluid pressure existing in the prior art transmission servo assembly and a more resistive biasing member included with transmission servo assembly 100, the total amount of force available to apply a servo pin to a band is about 6.4% greater.

| Case | 1st gear applied Apply pathway pressurized Release circuit at 0 psi Servo pin fully stroked (toward band) | | | 2nd gear initiated Apply pathway pressurized Release pathway pressurized at same pressure Pin fully stroked (toward band) | | | 2nd gear fully applied Apply pathway pressurized Release pathway pressurized at same pressure, pin at equilibrium (stopped by cover or total force equals zero) | | | |
|---|---|---|---|---|---|---|---|---|---|---|
| | Force from piston(s) applying the band | Force from the spring retracting the band | Total force acting to apply the band | Force from piston(s) applying the band | Force from the spring retracting the band | Total force acting to apply the band | Force from piston (s) applying the band | Force from the spring retracting the band | Total force acting to apply the band | Resting position |
| Prior art transmission servo assembly operating at 300 psi | 1824 lbf | 111 lbf | 1713 lbf | 93 lbf | 111 lbf | −18 lbf | 93 lbf | 93 lbf | 0 lbf | 25% |
| An exemplary transmission servo assembly 100 operating at 250 psi | 1982 lbf | 160 lbf | 1822 lbf | 78 lbf | 160 lbf | −82 lbf | 78 lbf | 89 lbf | −11 lbf | ~100% retracted (bottomed out cover) | rator 252, which slidingly engages tubular region 216 when primary piston 204 is caused to move axially.

When a gear shift is desired, release fluid is rapidly introduced into the release pathway so as to provide a countervailing force on primary piston 204 and secondary piston 208, which act in tandem upon a snap ring 294 disposed on servo pin 104 and thereby disengage apply tip 136. The combined fluid pressure of release fluid on primary piston 204 and secondary piston 208 is less than the pressure applied by apply fluid on the opposite surfaces of the primary piston and the secondary piston. The lower release fluid pressure is warranted because biasing member 112 provides the additional force necessary to return primary piston 204 and secondary piston 208 to the unapplied position shown in FIG. 2.

Table 1, below, compares the pressures exerted on a prior art transmission servo assembly having a fluid operating pressure of 300 psi, such as prior art transmission servo assembly 20 described above, and an exemplary embodiment of transmission servo assembly 100 operating with a fluid pressure of 250 psi. In this exemplary embodiment, the transmission is shifted from first to second gear. When in first gear, the apply pathway is pressurized at the fluid pressures mentioned above for each of the respective assemblies. The resultant force on the piston within the prior art transmission servo assemblies is 1824 lbf, while the force applied to dual piston assembly 108

As the operator moves to shift the car into second gear, in both the prior art transmission servo assembly and transmission servo assembly 100, a release pathway is pressurized. The fluid pressure of the fluid in the release pathway is at the same pressure as the apply fluid, i.e., 300 psi for the prior art transmission servo assembly and 250 psi for transmission servo assembly 100, but during this initiation process, the servo pin is still applied to the band. As shown in Table 1, the total amount of force being applied to the band is −18 lbf and −82 lbf for the prior art transmission servo assembly and transmission servo assembly 100, respectively. The difference between the two values is due, at least in part, to the more resistive biasing member 112, which, because of dual piston assembly 108, can have a larger resistance than the prior art servo assembly biasing member.

When second gear is fully applied, servo pin 104 has been released from the band by biasing member 112. As mentioned previously, biasing member 112 is designed and configured to have initial and ending forces so as to fully disengage servo pin 104. This is evident from the second to last column of Table 1 which shows that the pressure against dual piston assembly 108 is −11 lbf, even when servo pin is resting against the cover included within transmission servo assembly 100.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A transmission servo assembly configured to be disposed in an assembly housing including an aperture at a first end, the transmission servo assembly comprising:
   a servo pin movable between a resting position and a biased position, said servo pin having an exterior surface coaxial with a longitudinal axis and being configured to extend through said aperture at the housing first end, said servo pin including a fluid pathway and a plurality of apertures extending from said fluid pathway to said exterior surface of said servo pin;
   a primary piston coaxial with said servo pin and having an interior surface that slidingly engages said exterior surface of said servo pin, the primary piston comprising a larger diameter region and a tubular region extending from the larger diameter region along said servo pin opposite the housing first end;
   a secondary piston coaxial with said primary piston and said servo pin abutting said tubular region of the primary piston, wherein said secondary piston has an interior surface that slidingly engages said exterior surface of said servo pin, and wherein said primary piston and said secondary piston coact to move said servo pin relative to said aperture;
   a separator slidingly disposed around said tubular region of the primary piston in sealing engagement therewith;
   a biasing member having a first end in contact with said primary piston and a second end in contact with said assembly housing, and wherein said biasing member is designed and configured to exert a biasing force to said primary piston and said secondary piston;
   a first chamber and a third fluid chamber in fluid communication with said fluid Pathway; and
   a second chamber communicating with a fourth chamber, said second chamber and said fourth chamber being fluidly isolated from said first chamber and said third chamber within said assembly housing, wherein said second and fourth fluid chambers provide apply pressure to said primary and secondary pistons, respectively.

2. A transmission servo assembly according to claim 1, wherein:
   said servo pin includes a shoulder facing opposite said first end;
   said primary piston is biased against said shoulder by fluid pressure in said second and fourth chambers; and
   said biasing member exerts a biasing force sufficient to substantially prevent movement of said servo pin relative to said aperture when said transmission servo assembly is in the resting position.

3. A transmission servo assembly according to claim 1, wherein said transmission servo assembly is designed and configured for use in a transmission from the group of Powerglide, GM4L60E, GM200-4r, Chrysler 48RE, Ford C4, and Ford C6.

4. A transmission servo assembly according to claim 1, wherein said transmission servo assembly is designed and configured for use in a Powerglide transmission.

5. A transmission servo assembly according to claim 1, further comprising a removable cover configured to close said assembly housing opposite said servo pin aperture.

6. A transmission servo assembly according to claim 5, wherein said removable cover includes an annular projection designed and configured to enter into and sealingly engage with said assembly housing.

7. A transmission servo assembly according to claim 6, wherein said annular projection is sized and configured to provide a fluid path between an exterior surface of said annular projection and an interior surface of said assembly housing.

8. A transmission servo assembly, comprising:
   an assembly housing defining an interior space with an inner diameter and further defining a smaller servo pin aperture at a first end and an open second end;
   a servo pin slidingly disposed in and extending from the servo pin aperture;
   a dual piston assembly disposed in said interior space around said servo pin and configured to translate the servo pin toward the first end in response to applied fluid pressure, the dual piston assembly comprising:
      a primary piston slidingly disposed around said servo pin in said housing interior space, the primary piston comprising a larger diameter region and a tubular region extending from the larger diameter region along said servo pin opposite the housing first end, said larger diameter region having an outer diameter engaging the housing at said interior space inner diameter,
      a separator slidingly disposed around said tubular region of the primary piston in sealing engagement therewith, said separator having an outer diameter less than the outer diameter of the larger diameter region of the primary piston, and
      a secondary piston slidingly disposed around said servo pin in said housing interior space abutting the tubular region of the primary piston, said secondary piston having an outer diameter less than the outer diameter of said separator;
   a cover closing said housing interior space, the cover defining a stepped cavity facing the housing interior space with a first inner diameter configured to engage said separator outer diameter and a second inner diameter configured to engage said secondary piston outer diameter; and
   a biasing member disposed around said servo pin and extending between said dual piston assembly and the housing to bias dual piston assembly away from the housing first end.

9. The transmission servo assembly according to claim 8, wherein:
   said housing defines an apply fluid port communicating with the housing interior space on an apply side of the primary piston opposite said housing first end;
   said cover has a first outer diameter configured to engage said housing interior space inner diameter and a second, smaller diameter configured to form a fluid gap between said second, smaller diameter and the housing interior space inner diameter;
   said cover further defines a fluid port providing fluid communication through said cover between said fluid gap and the cover cavity second inner diameter; and
   said apply fluid port further communicates with said fluid gap and said cover cavity inner diameter through said cover fluid port to supply fluid to an apply side of the secondary piston.

10. The transmission servo assembly according to claim 9, wherein:
   said housing defines a release fluid port communicating with the housing interior space on a release side of the primary piston opposite said apply side; and
   said servo pin defines a fluid tunnel through said servo pin providing fluid communication between said release side of the primary piston and said cover cavity second inner diameter opposite said separator to supply release fluid to the secondary piston.

* * * * *